(12) United States Patent
Johnson

(10) Patent No.: US 7,856,482 B2
(45) Date of Patent: Dec. 21, 2010

(54) METHOD AND SYSTEM FOR CORRELATING TRANSACTIONS AND MESSAGES

(75) Inventor: Mark W. Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/174,272

(22) Filed: Jul. 16, 2008

(65) Prior Publication Data

US 2008/0288608 A1 Nov. 20, 2008

Related U.S. Application Data

(63) Continuation of application No. 10/324,572, filed on Dec. 18, 2002, now Pat. No. 7,441,008.

(51) Int. Cl.
*G06F 15/167* (2006.01)
(52) U.S. Cl. .................. 709/213; 709/224
(58) Field of Classification Search .......... 709/213, 709/223, 224; 718/100; 707/821
See application file for complete search history.

(56) References Cited

U.S. PATENT DOCUMENTS

| | | | |
|---|---|---|---|
| 5,414,841 A | 5/1995 | Bingham et al. |
| 5,983,170 A | 11/1999 | Goodman |
| 6,021,419 A | 2/2000 | Clarke, Jr. et al. |
| 6,061,741 A | 5/2000 | Murphy, Jr. et al. |
| 6,457,078 B1 | 9/2002 | Magro et al. |
| 2001/0052077 A1 | 12/2001 | Fung et al. |
| 2001/0052910 A1 | 12/2001 | Parekh et al. |
| 2001/0055393 A1 | 12/2001 | Sundaravel et al. |
| 2002/0010911 A1 | 1/2002 | Cheng et al. |
| 2002/0038352 A1 | 3/2002 | Ashley |
| 2002/0065919 A1 | 5/2002 | Taylor et al. |

(Continued)

FOREIGN PATENT DOCUMENTS

WO 02/063517 A2 8/2002

OTHER PUBLICATIONS

Chang et al., "A Dynamic Token-Based Distributed Mutual Exclusion Algorithm", Proceedings of the Tenth Annual International Phoenix Conference on Computers and Communications, pp. 240-246, 1991.

*Primary Examiner*—Asad M Nawaz
*Assistant Examiner*—Bradford F Fritz
(74) *Attorney, Agent, or Firm*—Yee & Associates, P.C.; Jeffrey S. LaBaw

(57) ABSTRACT

A method is presented for correlating related transactions, such as a parent transaction that invokes a child transaction within a distributed data processing system, using a particular format for the correlation tokens. Each transaction is associated with a correlation token containing a hierarchical, three-layer identifier that includes a local transaction identifier and a local system identifier, which are associated with the local system of the child transaction, along with a root transaction identifier, a root system identifier, and a registry identifier. The local transaction identifier is unique within the local system, and the local system identifier is unique within a registry that contains a set of system identifiers. The registry is associated with a domain in which the local systems operate, and multiple domains exist within a transaction space of entities that use these correlation tokens. Correlation token pairs are analyzed to construct a call graph of related transactions.

26 Claims, 5 Drawing Sheets

U.S. PATENT DOCUMENTS

| | | |
|---|---|---|
| 2002/0147924 A1 | 10/2002 | Flyntz |
| 2002/0161591 A1 | 10/2002 | Danneels et al. |
| 2003/0009545 A1 | 1/2003 | Sahai et al. |
| 2003/0093772 A1 | 5/2003 | Stephenson |

METHOD AND SYSTEM FOR CORRELATING TRANSACTIONS AND MESSAGES

This application is a continuation of application Ser. No. 10/324,572, filed Dec. 18, 2002, status allowed.

BACKGROUND OF THE INVENTION

1. Field of the Invention

The present invention relates to an improved data processing system and, in particular, to a method and apparatus for information processing. Still more particularly, the present invention relates generally to multicomputer data transferring.

2. Description of Related Art

Transactions, which can be regarded as any unit of computational work or a message that represents one, usually cause the invocation of other transactions, each of which may repeat the process, particularly in distributed data processing systems such as the World Wide Web. The resulting cascade of transactions can be represented as a directed graph of transactions; a single root node represents a root or initial transaction, and an arbitrarily large number of intermediate and leaf nodes in the graph represent subsequent transactions.

Each node in the directed graph, i.e. each transaction, can be identified by a correlation token with a unique value. Hence, a correlation token contains a unique value which logically associates a node in the directed graph with its represented transaction; from another perspective, the correlation token identifies the represented transaction. Each transaction's invocation by a parent transaction can be represented by an arc in the directed graph. An arc is identified by a pair of correlation tokens, one of which represents a transaction and one of which represents a parent transaction; however, there could be multiple parent transactions for a given transaction, and the root transaction does not have a parent transaction.

If all of the pairs of correlation tokens are aggregated together, a straightforward algorithm can be used to search through the tokens and to build a particular call graph, which is a particular directed graph that comprises a set of invocation arcs for a set of related transactions. Problems arise, however, when putting this into practice.

In a modern computer system, there may be many thousands or millions of systems that could be involved in any one call graph. Although the number of systems actually in a particular call graph is typically not more than 5-25, the pool of systems that might be in the call graph may be thousands or millions, and transactions from the entire pool represents the search space. Each system in a call graph may be executing thousands of transactions per second, which results in an enormous amount of data spread across millions of systems. As an example of a computationally intensive algorithm for aggregating the correlation tokens, all of the correlation token data could be sent to a central system and analyzed there. Although this is algorithmically simple, it is impractical given the number of systems and the volume of data.

In an alternative algorithm, some network-related data that indicates the location of a transaction's parent could be stored in each correlation token, and the token pair data could be stored on the system on which it was collected. This avoids the network bandwidth to move the data to a central system unless the specific data is required. A call graph can be built starting from a leaf node back to the root one step at a time but not from the root node towards the leaf nodes.

This alternative algorithm has limited utility because there are three constraints to build a complete call graph. The first constraint, termed "C1" for reference purposes, requires that every leaf node in a directed graph must be known. The second constraint, termed "C2", requires that the identity of each transaction that is part of the call graph on each leaf node must be known. The third constraint, termed "C3", requires that the network location in the token must be understood by the analysis program. Constraints "C1" and "C2" render the solution impractical; without further data, this information for each of these constraints is unknown.

A partial solution to these constraints can be achieved using a technique in the Application Response Measurement (ARM) standard, which uses a trace flag in each correlation token. A trace flag in the correlation token of the root transaction is turned on. At each intermediate and leaf node, i.e. each time that a child correlation token needs to be generated, the trace flag in the parent correlation token is inspected. If the trace flag is turned on in the parent correlation token, then the trace flag in the child correlation token is turned on. This results in the trace flag being turned on in all of the correlation data for the transactions in a particular call graph. If each system sends all correlation data having an active trace flag to a central system for analysis, the central system would be able to build the particular call graph.

However, there are two significant limitations with this approach. First, the trace flag must be turned on in the root transaction before the root transaction starts so that the trace flag will propagate to the intermediate and leaf node transactions. This limitation precludes the ability to make a determination about whether to trace a family of transactions based on observed attributes of a transaction, such as a slow response time or the existence of an error, or any other conditions for which tracing might be desirable after the root transaction has already started. Second, if the trace flag is turned on in many root transactions to avoid the first limitation, an overabundance of data will be generated, thereby creating the same bandwidth and processing bottleneck that rendered impractical the previously described simple algorithm.

Constraint "C3" limits the utility of the above noted algorithm to those systems that share a common understanding of network location. Although a common understanding of network location can be achieved with long system identifiers, this approach conflicts with the need to keep correlation tokens as small as possible. In addition, it may expose information about network internals, which itself may pose a security risk.

Short system identifiers solve this network location interpretation problem if the short system identifiers are used as keys into a registry that contains sufficient information to unambiguously determine a particular network location. However, this approach creates a need for there to be a small number of registries that contain this information so that the search space is reasonably bounded. This approach may also require coordination between the owners of the registries to avoid the same short system identifier from being stored in multiple registries. In a large distributed data processing system like the World Wide Web, there would be a need for numerous registries, generally grouped in domains such as a company or a large division in a company. It is not practical to expect coordination between the owners of all the registries, nor is it practical to perform an exhaustive search.

Therefore, it would be advantageous to have a technique for generating correlation tokens with associated identifiers that can be practically stored and processed for analyzing transactions in large distributed data processing systems such as the World Wide Web.

SUMMARY OF THE INVENTION

A method is presented for correlating related transactions, such as a parent transaction that invokes a child transaction within a distributed data processing system, using a particular format for the correlation tokens. Each transaction is associated with a correlation token, and each correlation token contains a hierarchical, three-layer identifier that includes a local transaction identifier, a local system identifier, a root transaction identifier, a root system identifier, and a registry identifier. The local transaction identifier and the local system identifier are associated with the local system that is performing the child transaction. The local transaction identifier is unique within the local system within a given period of time, and the local system identifier is unique within a registry that contains a set of system identifiers. The registry is associated with a domain in which the local systems operate, and multiple domains and registries may exist within a transaction space of entities that use and interpret these correlation tokens. A child correlation token contains values that are based upon the values in its parent correlation token. Pairs of correlation tokens can be analyzed to construct a call graph for a family of related transactions.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
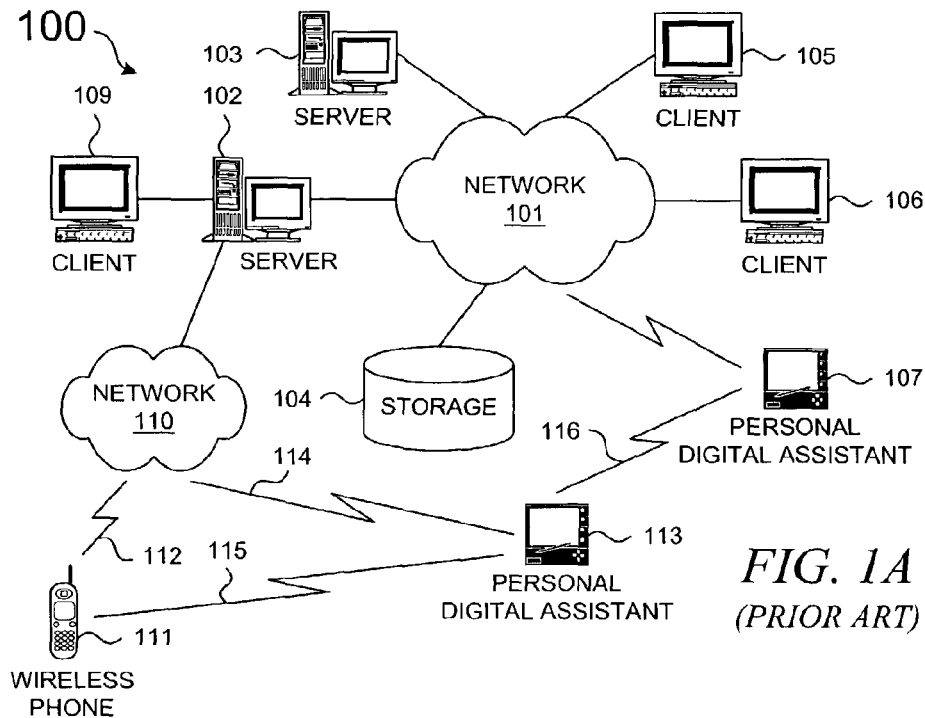
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
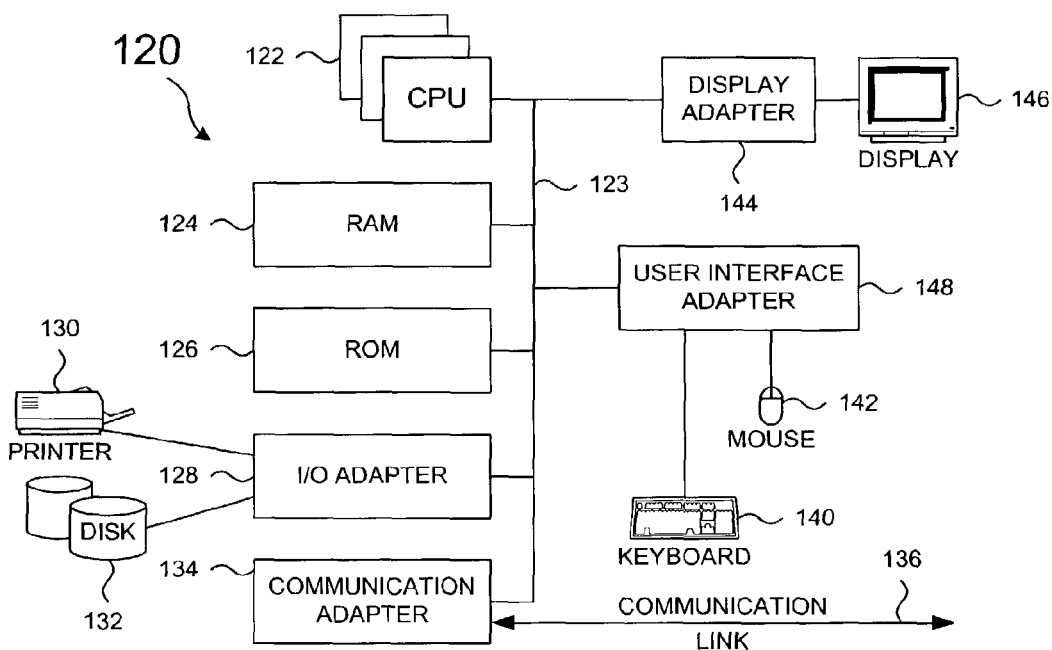
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

Figure 2A:
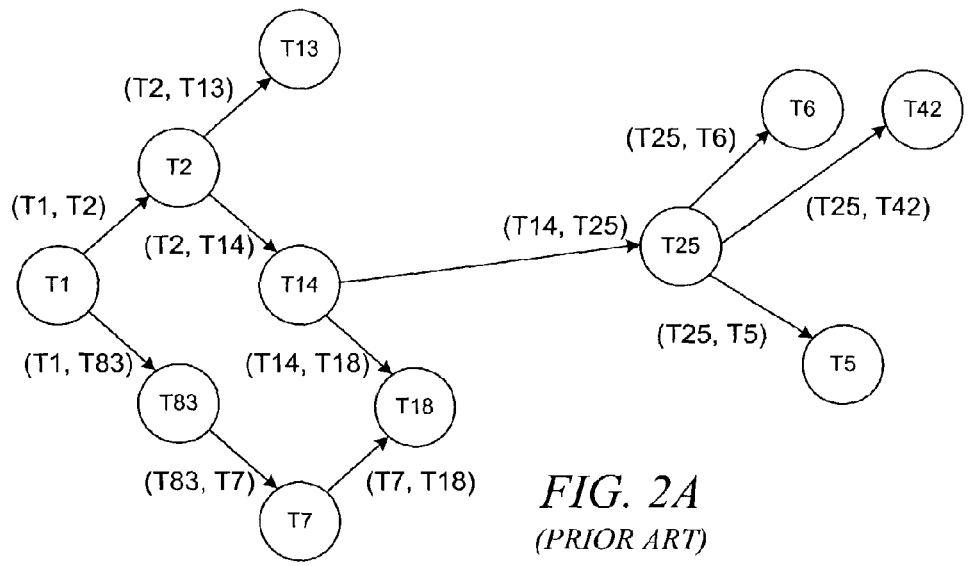
FIG. 2A depicts a directed graph that shows a prior art technique for correlating transactions.

With reference now to FIG. 2A, a directed graph depicts a prior art technique for correlating transactions. As mentioned above, a cascade of transactions can be represented as a directed graph of transactions; a single root node represents a root or initial transaction, and an arbitrarily large number of intermediate and leaf nodes in the graph represent subsequent transactions. In the examples that are discussed below, a transaction can be broadly regarded as any unit of computational work or a message that represents said transaction or work.

Each node in the directed graph, i.e. each transaction, can be identified by a correlation token with a unique value, such as transaction T83. Hence, a correlation token contains a unique value which logically associates a node in the directed graph with its represented transaction; from another perspective, the correlation token identifies the represented transaction.

Each transaction's invocation by a parent transaction can be represented by an arc in the directed graph. An arc is identified by a pair of correlation tokens, one of which represents a transaction and one of which represents a parent transaction. For example, transaction T7 is the child transaction of transaction T83. The invocation of transaction T7 by transaction T83 is represented by arc (T83, T7), which may also be identified as correlation token pair (T83, T7). The transactions do not have consecutive identifiers because each system that generates a transaction identifier may due so independently without coordinating identifiers along arcs or among related transactions.

Figure 2B:
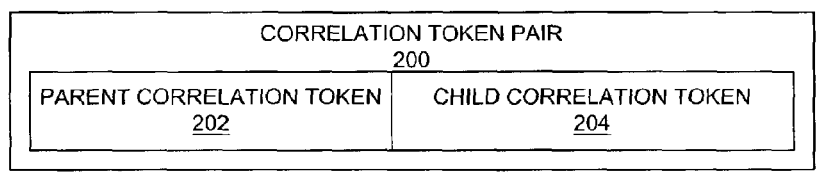
FIG. 2B depicts a typical correlation token pair.

With reference now to FIG. 2B, a block diagram depicts a typical correlation token pair. Correlation token pair 200 comprises parent correlation token 202 and child correlation token 204. When a correlation token pair is logged or recorded, the system that generates the child correlation token would regard the child correlation token as referring to a local transaction within the system. A correlation token pair may comprise a data item in which the parent correlation token and the child correlation token are embedded within the data time like a container data element, or a correlation token pair may refer to an association between the parent correlation token and the child correlation token such that they are stored in association with one another and are processable as a single data element without being contained within another data element.

A typical manner of generating a correlation token pair would include the following steps. First, a server would receive a transaction request message that is requesting the performance of a particular computational task; it may be assumed that this request represents the spawning of a child transaction by a parent transaction. The server generates a child correlation token for the local transaction that is to be performed in response to the transaction request message. The server also extracts a parent correlation token from the transaction request message, wherein the parent correlation token identifies a parent transaction that requires the performance of the local transaction. The correlation token pair comprising the parent correlation token and the child correlation token is stored for later retrieval by a transaction analysis application.

Figure 3:
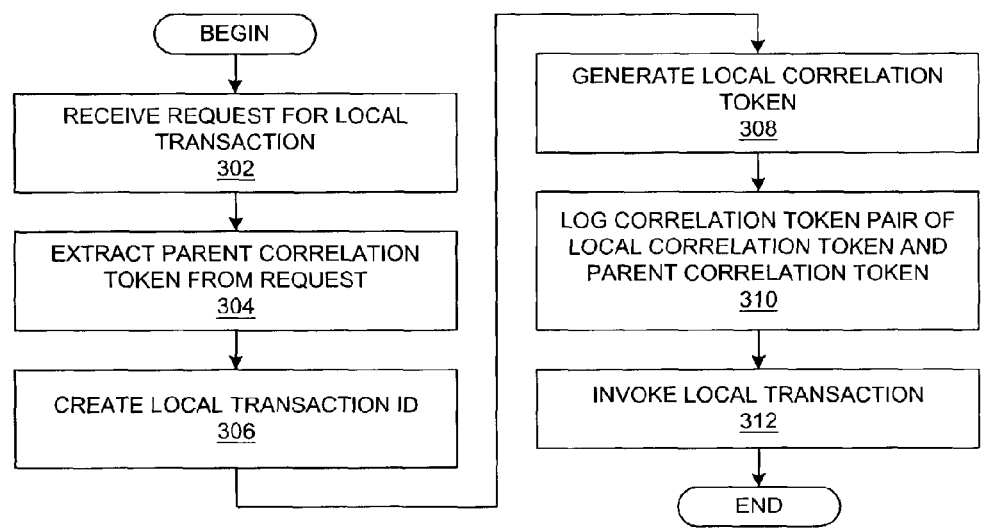
FIG. 3 depicts a flowchart that shows a typical process for generating and storing correlation tokens in conjunction with transaction processing.

With reference now to FIG. 3, a flowchart depicts a typical process for generating and storing correlation tokens in conjunction with transaction processing. The process begins when a local system receives a request message for a local transaction (step 302); the type of application that may process the incoming request within the local system may vary. This incoming request may be assumed to have originated at a remote system in response to a need for some type of resource that is required by a pending transaction at the remote system; in other words, a parent transaction at the remote system has spawned a child transaction at the local system.

The local system extracts from the incoming request a correlation token that has accompanied the request (step 304). In accordance with a variety of protocols, a correlation token may be used as a request identifier. The correlation token accompanies a resource request, and it is expected that a response message from the local system to the remote system would echo back this correlation token. Upon receiving the response for the resource request, the correlation token can be extracted by the remote system and then used for identifying the request.

Hence, to the remote system, the correlation token for the incoming request at the local system may be regarded as merely a correlation token, even though this correlation token may itself have been generated in response to a parent transaction. However, with respect to the local system, this correlation token can be described as a parent correlation token because the local system expects to spawn a child transaction to satisfy the incoming resource request. When viewed from the perspective of the local system in consideration of the remote system, this child transaction will be accompanied by a child correlation token that performs the same purpose within the local system as the parent correlation token performs in the remote system.

After extracting the parent correlation token from the incoming request, the local system creates a local transaction identifier for identifying the child transaction at the local system (step 306). Again, the local transaction can be viewed as a child transaction from an overall perspective that includes the source of the request that caused the local transaction. The local transaction within the local system does not necessarily include any special processing that identifies the local transaction as the child transaction of a parent transaction at a remote system.

The local system then generates a local correlation token (step 308) that will accompany any transaction operations or transaction messages for the local transaction; a correlation token may be assumed to be more robust than a transaction identifier as the correlation token may comprise the transaction identifier along with other transaction-related information.

At some point, the local correlation token is logged along with the parent correlation token as a correlation token pair (step 310). This step may also be performed in accordance with a variety of transaction protocols. The correlation token information would be stored within a database that acts as a historical record of the transactions. These historical records can be retrieved at some later point in time for transaction analysis, e.g., for obtaining performance metric information.

In addition, the local transaction is initiated or invoked within the local system (step 312), thereby concluding the portion of local transaction processing that is concerned with generating and storing correlation tokens in conjunction with transaction processing.

Assuming that the local transaction is completed in some manner, a response message would be returned to the remote system so that the remote system may conclude the processing of the pending parent transaction. However, the local transaction may itself spawn additional transactions; those additional transactions may be regarded as child transactions of the local transaction, thereby shifting the processing perspective of the local transaction such that it may be regarded as a parent transaction. This family of related transactions can later be analyzed as a call graph, i.e. a type of directed graph, through the use of correlation token pairs.

The present invention may be implemented on a variety of hardware and software platforms, as described above. More specifically, though, the present invention is directed to a technique for correlating transactions, e.g., for obtaining historical transaction information to create a call graph for a family of related transactions such that the call graph can itself be analyzed for various purposes. The present invention consists of the following elements: a data structure for a correlation token, which contains of a set of data items that are arranged in a three-layer hierarchy and that are combined to form a unique identifier; a procedure for selecting identifiers based on the token from the parent transaction and the properties of the local system; and algorithms for building call graphs using tokens that have been created in this manner. The technique of the present invention is described in more detail with respect to the remaining figures.

Figure 4:
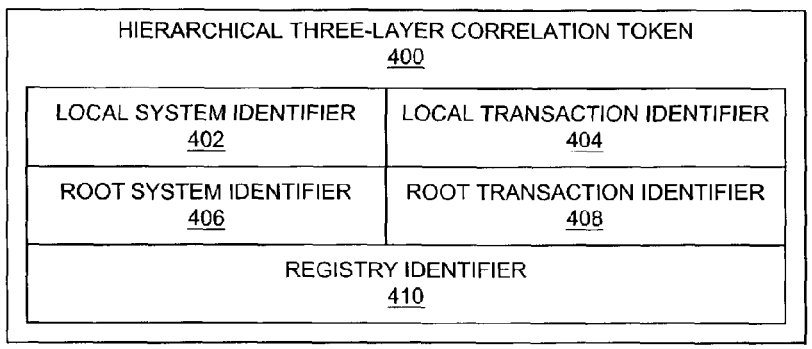
FIG. 4 depicts a block diagram that shows a data structure for a correlation token in accordance with the present invention.

With reference now to FIG. 4, a block diagram depicts a data structure for a correlation token in accordance with the present invention. In a manner similar to that described above, the present invention employs correlation tokens pairs to build call graphs, but in the present invention, the correlation token data structure has a novel structure. Correlation token 400 has five identifiers arranged in a hierarchical three-layer structure. The first layer comprises local system identifier 402 combined with local transaction identifier 404; the transaction identifier is local within the system, so for convenience, these may be referred to as "transaction identifier" and "system identifier", respectively. The second layer comprises root system identifier 406 combined with root transaction identifier 408; the root transaction identifier is unique within the root system. The third layer comprises registry identifier 410 for a registry of system identifiers. Both the local system identifier and the root system identifier are unique keys into the registry; for example, the registry may be implemented as a database containing network addresses associated with the system identifiers as keys.

Uniqueness is achieved at each layer and/or across all layers in the following manner. First, the registry identifier is universally unique. Prior art techniques exist to create universally unique identifiers without coordination between owners of the identifiers; an example is the 16-byte UUID (Universally Unique IDentifier) created by DCE 1.1 Remote Procedure Call specification.

Second, each system identifier is unique within the registry. Each system identifier may be universally unique in its own right without cooperation between the owners of the identifiers, or each system identifier may be allocated in a way that makes it unique within the registry. If the registry identifier is universally unique, then the combination of the registry identifier and a system identifier will be universally unique.

Third, each transaction identifier is unique within the scope of its system identifier; incidentally, a transaction identifier may be universally unique in its own right. The combination of a registry identifier and a system identifier and a transaction identifier is unique. The uniqueness of a local transaction identifier is expected to last for a suitably long period of time such that its uniqueness exceeds the maximum time period over which correlation of transactions might occur. For example, if no correlation analysis will be performed on data that exceeds a seven day period, then the transaction identifier needs to be unique over at least a seven day period.

Figure 5:
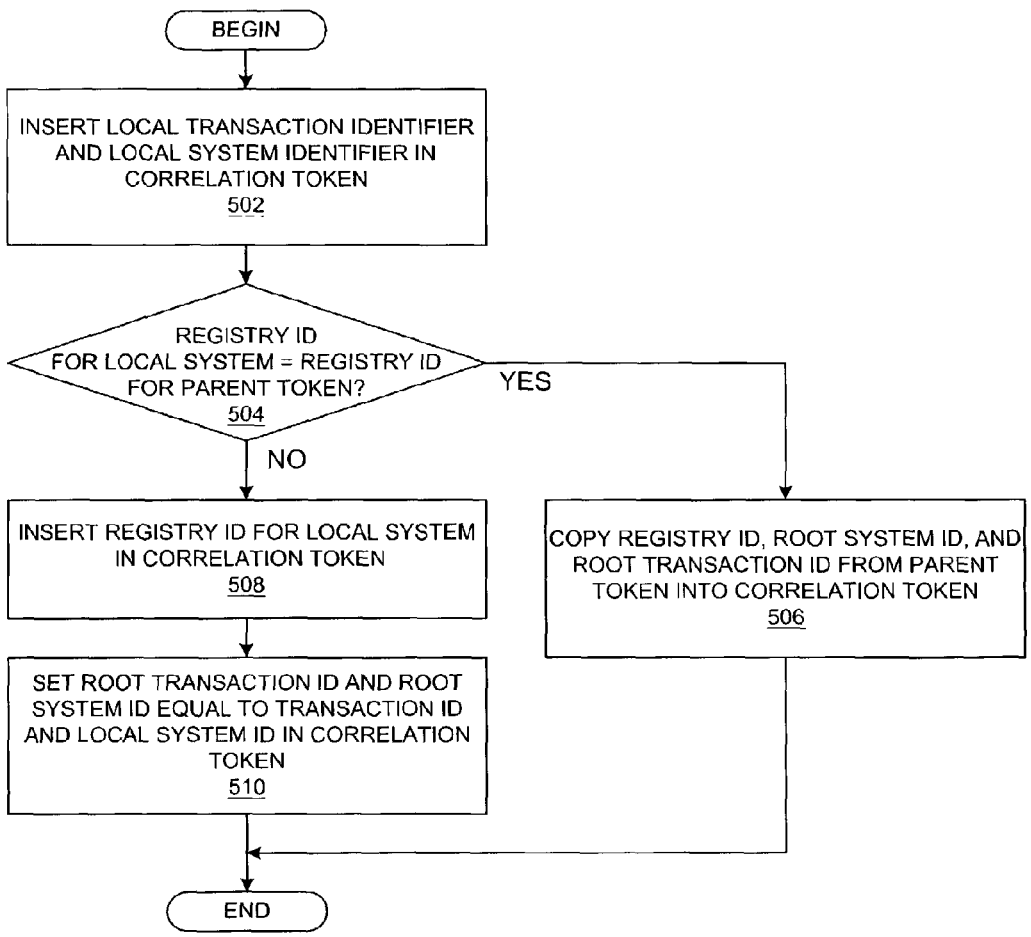
FIG. 5 depicts a flowchart that shows a process for generating a correlation token in accordance with the present invention.

With reference now to FIG. 5, a flowchart depicts a process for generating a correlation token in accordance with the present invention. The process that is shown in FIG. 5 may be completed by any appropriate agent within a given system, such as a transaction manager within a given system that has responsibility for uniquely naming transactions when a transaction begins executing.

The process begins by inserting the transaction identifier and the local system identifier into a current correlation token (step 502), e.g., a data structure that represents a correlation token for a currently pending transaction. A determination is then made as to whether the registry identifier of the registry in which the local system identifier is stored is the same as the registry identifier in the parent correlation token (step 504). If so, then the root transaction tuple comprising the registry identifier, the root system identifier, and the root transaction identifier is copied from the parent correlation token to the current correlation token (step 506), and the process is complete.

If the identifier of the registry in which the local system identifier is stored is not the same as the registry identifier in the parent correlation token, then the registry identifier of the local system is inserted into the current correlation token (step 508), and the root system identifier and the root transaction identifier are set to be equal to the local system identifier and the local transaction identifier (step 510), and the process is complete. In other words, the current transaction becomes a new root transaction within the local system; assuming that the current transaction causes the invocation of additional transactions, then the current transaction becomes a new root transaction within the local domain. This results in the possibility of a call graph that spans multiple domains. Step 510 is also completed if there is no parent correlation token or if the registry identifier in the parent correlation token is not recognized as part of a control domain that ensures uniqueness within the domain.

The primary value for the correlation tokens of the present invention becomes apparent when building a call graph for a family of related transactions. After the call graph is built, details about the transactions represented by the nodes of the call graph can be collected for various purposes, such as analyzing response times, locating bottlenecks, and determining why a transaction may never have completed due to its dependence on child transactions.

There are two categories of algorithms for building a call graph for a family of related transactions. One approach starts at a leaf or intermediate node and works back towards the root node; this approach is described with respect to FIG. 6. The other approach starts at the root or an intermediate node and works down towards the leaf nodes; this approach is described with respect to FIG. 7.

Figure 6:
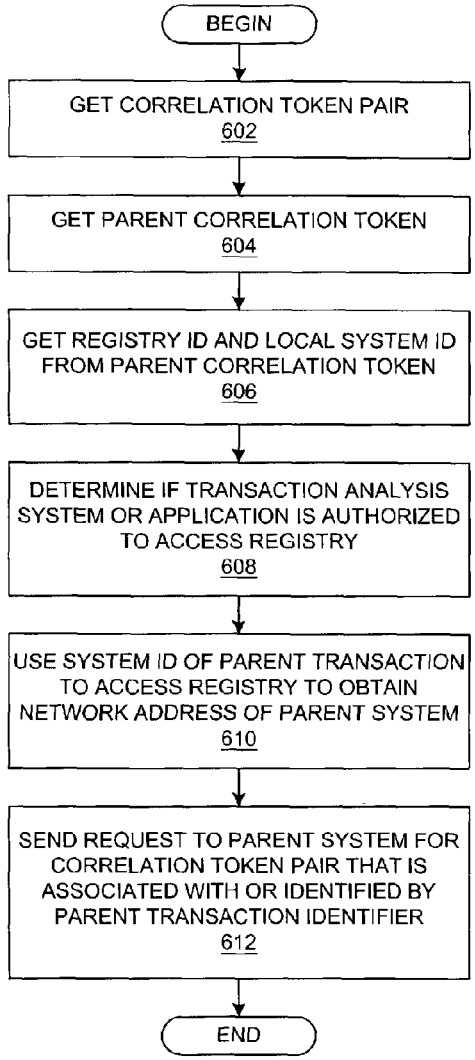
FIG. 6 depicts a flowchart that shows a process for building a call graph for a family of related transactions by starting at a leaf or intermediate node within the call graph and proceeding towards the root node using the correlation tokens that were generated by the process shown in FIG. 5.

With reference now to FIG. 6, a flowchart depicts a process for building a call graph for a family of related transactions by starting at a leaf or intermediate node within the call graph and proceeding towards the root node using the correlation tokens that were generated by the process shown in FIG. 5. The process that is shown in FIG. 6 represents only a portion of an overall transaction analysis process, which might obtain all transactions in a particular call graph for analyzing various aspects of transaction processing, such as temporal characteristics of the data flow or control flow throughout a family of transactions, e.g., processing bottlenecks. Moreover, the process that is shown in FIG. 6 only determines a single arc within a call graph; hence, this process may also be considered to be only part of a larger process for constructing and maintaining the data structures that represent a call graph.

It may be assumed that the process that is shown in FIG. 6 may be performed by a wide variety of data processing systems. In addition, it may be assumed that a particular data processing system has the appropriate credentials for legitimately obtaining and processing some transaction-related information. However, as described below, a particular system does not necessarily have appropriate credentials for performing all operations that it may attempt to perform.

In other words, these steps may be performed by any system and/or application within a given transaction space of a large distributed data processing system. A transaction space may be regarded as a set of systems and/or applications that employ a common technique for tracking, storing, correlating, and/or analyzing historical transaction information. A transaction space may be divided into transaction domains in which a set of entities, such as systems, services, or applications, use a common registry.

The type of system or application that is performing these transaction-related operations may vary widely without affecting the scope of the present invention. However, the fact that a particular system or transaction analysis application has the ability to obtain some transaction information and to appropriately interpret that transaction information does not necessarily mean that the particular system or application has the ability to obtain and/or interpret any and all transaction information within the transaction space.

Referring to FIG. 6, the process begins by obtaining a correlation token pair (step 602). The source of the correlation token pair may vary without affecting the scope of the present invention. For example, this correlation token pair may have been obtained from a database on a local system that also supports the application that is performing the transaction analysis process, which may be termed the transaction analysis application; it may be assumed that there is a database that logs transaction-related information for historical and/or analytical purposes. Using the local transaction identifier of the current transaction, i.e. the transaction that is currently being processed, which may be the seed transaction from which the call graph is being constructed, the database is queried using the local transaction identifier as a key to locate its associated correlation token pair. Alternatively, the correlation token pair may have been obtained from a system that is remote to the system or application that is performing the transaction analysis process.

In addition, the protocol and message formats for requesting and receiving correlation tokens may vary without affecting the scope of the present invention. Although a common protocol is preferably used throughout a transaction space, multiple protocols may be used. It is implicit, however, that the data processing systems and applications within a transaction space have the ability to communicate messages and to interpret the information within those messages.

The parent correlation token is extracted from the correlation token pair (step 604). The data format for a correlation token or a correlation token pair may vary without affecting the scope of the present invention. For example, the correlation token may comprise a set of binary data items or a set of XML-tagged elements within a document; this information format may be proprietary within a transaction space, or it may adhere to public standards and specifications.

In accordance with the correlation token data structure that is described with respect to FIG. 4, the registry identifier and the local system identifier are extracted from the parent correlation token (step 606). Given the correlation tokens that are used within the present invention, it is implicit that the local system identifier from the parent correlation token is the system identifier for the system that originated the parent transaction.

Preferably, before the registry that is identified by the extracted registry identifier can be accessed, a determination is made as to whether the transaction analysis application has the appropriate authorization to access the registry (step 608). The method of processing authorization credentials with respect to systems and applications within a transaction space may vary without affecting the scope of the present invention. However, it is important to note that the registries in the present invention provide focal points for applying authorization restrictions. When a system or application is performing a transaction analysis, these authorization points provide an opportunity for limiting the amount of transaction-related information that may be gathered by a particular system or application. From the perspective of building a particular call graph, the traversal of the links in the call graph ends if a registry cannot be accessed.

Assuming that the transaction analysis application is authorized to access the identified registry, the system identifier of the parent system is then used as a key into the identified registry to retrieve a network address for the parent system (step 610). Using the retrieved network address and the local transaction identifier that was extracted from the parent correlation token, i.e. the transaction identifier that was generated and/or valid within the parent system, the transaction analysis application sends a request to the parent system for the correlation token pair that is associated with or identified by the parent transaction identifier (step 612), thereby completing the process.

The network address is used to address the request message, but it should be noted that other types of system identifiers may be stored within the registry provided that the system identifiers allow a transaction analysis system or application to route transaction information retrieval request messages to the identified systems. For example, the registries in the present invention may maintain Uniform Resource Identifiers (URIs) that allow transaction analysis systems and applications within the transaction space to use HTTP-based messages for retrieving or otherwise performing communication operations. It should also be noted that the network address may be an identifier for a service that proxies the parent system's data. Moreover, the registry may comprise a centralized data repository for storing transaction-related information, and upon receiving a request message, the registry could respond with transaction-related information immediately to the requesting system.

As noted above, the process that is shown in FIG. 6 determines sufficient information for spanning a single arc of a call graph. The link between the original correlation token pair and the subsequently retrieved correlation token pair, i.e. the parent correlation token pair, would be stored in an appropriate data structure or database for further processing. Meanwhile, the process that is shown in FIG. 6 would be repeated as required. If the entire call graph is being constructed, the process could be repeated until the root transaction was identified. As each node in the call graph is visited, the parent transaction identifier of the previous node becomes the local transaction identifier for the current node. Hence, at step 602, the retrieval of a correlation token pair may be equivalent to the retrieval of a parent transaction's correlation token pair at step 612, i.e. the process loops.

Otherwise, the transaction analysis application might continue processing until it encounters an authorization error with respect to a registry. Since a call graph may span multiple authorization domains, it is possible that the transaction analysis application may be able to retrieve correlation tokens within an authorization domain that includes the transaction analysis application, but where the call graph would branch into other authorization domains, the transaction analysis application may not be authorized to retrieve the information that would be required to continue building the call graph.

However, the correlation tokens and algorithms of the present invention improve on algorithms in the prior art because the actual identity of the parent system is opaque unless the requesting system or requesting application is authorized to know it. In addition, the transaction identifier that is used to access the parent transaction's data is unique.

Figure 7:
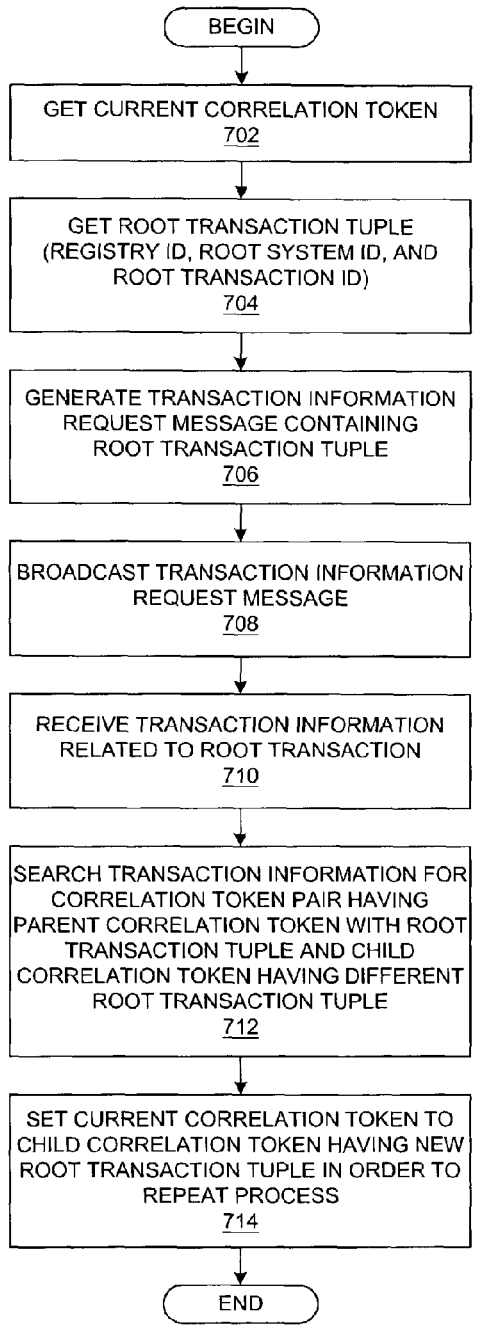
FIG. 7 depicts a flowchart that shows a process for building a call graph for a family of related transactions by starting at a root or intermediate node within the call graph and proceeding towards the leaf nodes using the correlation tokens that were generated by the process shown in FIG. 5.

With reference now to FIG. 7, a flowchart depicts a process for building a call graph for a family of related transactions by starting at a root or intermediate node within the call graph and proceeding towards the leaf nodes using the correlation tokens that were generated by the process shown in FIG. 5. As described above, the process that is illustrated within FIG. 6 provides an approach for building a call graph that follows the links of the call graph from an intermediate node or a leaf node towards a root node. However, the process that is illustrated within FIG. 7 is also an alternative to the process that is shown in FIG. 6 for building a call graph that proceeds in the opposite direction, i.e. from an intermediate node or a leaf node toward a root node.

The process that is shown in FIG. 7 relies on two characteristics. First, an identity of a root transaction, i.e. the root transaction tuple comprising the registry identifier, the root system identifier, and the root transaction identifier, is known because it is available in the initial correlation token that is processed; in fact, a root transaction tuple is available in all correlation tokens in the present invention. Hence, there is a common identifier in all the correlation tokens in the call graph with the same root transaction as the transaction from which the graph traversal is beginning.

Second, a means exists to search the transaction space to locate all correlation tokens with the common root transaction tuple. For example, the root transaction tuple could be broadcast to all the systems or services in the transaction space. The common identifier of the root transaction in the three-layer identifier data structure provides the key needed to perform a search. This technique also does not rely on a trace flag that would need to be turned on prior to collecting the data. Hence, the analysis can be performed spontaneously after the fact as long as the correlation token pair data has been maintained by the various systems.

Referring to FIG. 7, the process begins at a transaction analysis application by obtaining a correlation token, i.e. the correlation token that is currently being processed (step 702), from which a current root transaction tuple is extracted (step 704). A transaction information request message that contains the current root transaction tuple is generated (step 706) and is broadcast within the transaction space (step 708). The transaction analysis application then receives responses containing transaction information from the systems within the transaction space that had relevant correlation token pairs, i.e. correlation token pairs that contained the current root transaction tuple in which the transaction analysis application is interested (step 710).

The transaction domain within which the transaction analysis application is operating comprises systems that interoperate with a common registry. According to the rules of transaction identifier formation that were described with respect to FIG. 4, all systems within a transaction domain, i.e. that use a common registry, should use their common registry identifier in their transaction identifiers or correlation tokens. When a child transaction occurs within a different transaction domain, i.e. that uses a different registry from the parent transaction, it should set the root system identifier and the root transaction identifier to the local system identifier and the local transaction identifier. If a family of related transactions branches at some point into a different transaction domain, then the root transaction tuple in the correlation tokens would reflect the change of transaction domains within the hierarchical three-layer identifier structure of the present invention.

More importantly, the arc of the call graph that branches between transaction domains is associated with a correlation token pair that reflects the change of transaction domain. For this particular correlation token pair, the parent correlation token would refer to the current root transaction tuple that is used within the current transaction domain, and the child correlation token would refer to a different root transaction tuple that is used in the different transaction domain. In other words, the correlation token pair has mismatched root transaction tuples.

The process that is shown in FIG. 7 takes advantage of this feature. The transaction analysis application searches the received transaction information for any correlation token pairs that have a parent correlation token with the current root transaction tuple and a child correlation token with a different root transaction tuple (step 712). If no such correlation token pairs are found, then it may be assumed that the call graph does not have any arcs that link different transaction domains. It should be noted that multiple correlation token pairs like this could be found because any given transaction may spawn multiple child transactions.

However, assuming that at least one of these correlation token pairs is found, then the current correlation token is set to the child correlation token of this correlation token pair (step 714), and the process is complete. In particular, the current root transaction tuple is reset to the root transaction tuple in the child correlation token of this correlation token pair.

In a manner similar to that shown in FIG. 6, the process that is shown in FIG. 7 is a portion of a large process for building a call graph. The process that is shown in FIG. 7 merely obtains enough information for tracking a set of related transactions through a particular transaction domain. The process can then be repeated in which the newly obtained correlation token becomes the current correlation token within step 702 such that the call graph analysis can gather additional information for tracking related transaction through at least one other transaction domain. The process would be repeated as often as necessary until all transaction domains have been reached that do not branch into other transaction domains, i.e. until all leaf nodes of the call graph have been found.

Figure 8:
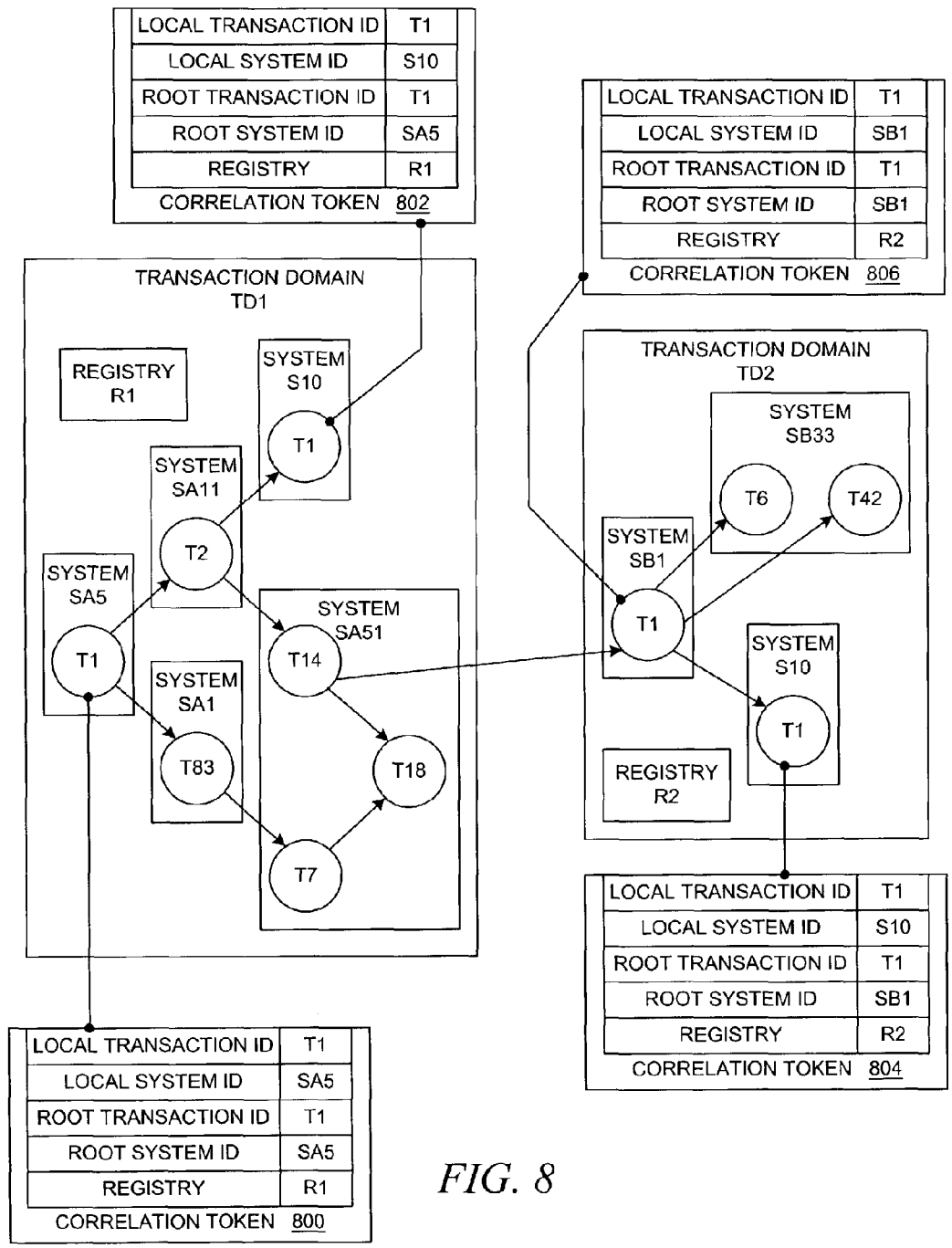
FIG. 8 depicts a block diagram that shows a pair of transaction domains with a family of related transactions for illustrating the technique of using the hierarchical three-layer transaction identifier or correlation token of the present invention.

With reference now to FIG. 8, a block diagram depicts a pair of transaction domains with a family of related transactions for illustrating the technique of using the hierarchical three-layer transaction identifier or correlation token of the present invention. A transaction domain comprises systems, services, and applications that rely on a common registry. In this example, transaction domain TD1 employs registry R1 and transaction domain TD2 employs registry R2. Transaction domain TD1 supports systems SA5, SA11, SA1, S10, and SA51, while transaction domain TD2 supports systems SB1, SB33, and S10. Together, transaction domains TD1 and TD2 may represent a given transaction space.

Each of the systems within FIG. 8 may support a transaction analysis application for retrieving information about transactions for various analytical purposes. Each of the systems within FIG. 8 supports a database for logging correlation token pairs or interacts with a proxy service that does so on its behalf.

Additionally, each of the systems supports a transaction manager that generates unique transaction identifiers within the system or interacts with a proxy service that does so on its behalf; the transaction identifiers are guaranteed to be unique over a period of time, which may be based on a configurable parameter. Each transaction manager would be responsible for maintaining knowledge about the transaction domain within which it resides, including obtaining its registry identifier and maintaining a unique system identifier within the transaction domain. A transaction manager would be also be responsible for obtaining an actual network address or resource identifier for the registry within a transaction domain so that the registry may be accessed when necessary to retrieve system identifier information; alternatively, a service may be provided for translating registry identifiers to resource identifiers. The manner in which these administrative operations occur within a large distributed data processing system may vary without affecting the scope of the present invention.

Transaction T1 at system SA5 has branched into a family of related transactions. Specifically, transaction T1 at system SA5 has spawned transaction T2 at system SA11 and transaction T83 at system SA1, which spawned transaction T7 at system SA51, which itself spawned transaction T18 within the same system SA51. Transaction T2 at system SA11 spawned transaction T1 at system S10 in transaction domain TD1 and transaction T14 in system SA51, which terminated in transaction T18 at system SA51 along with transaction T7 at system SA51.

Transaction T14 in system SA51 spawned a transaction into a different transaction domain, namely, transaction T1 at system SB1 in transaction domain TD2, which itself spawned three transactions: transactions T6 and T42 at system SB33 and transaction T1 at system s10 in transaction domain TD2.

Correlation tokens 800-806 reflect some of the advantages of using the hierarchical three-layer correlation tokens or transaction identifiers of the present invention. The initial or originating transaction T1 at system SA5 in transaction domain TD1, i.e. the root transaction for the particular call graph of interest in this example, can be represented by correlation token 800, which comprises local transaction identifier T1, local system identifier SA5, root transaction identifier T1, root system identifier SA5, and registry R1. Transaction T1 at system S10 in transaction domain TD1 can be represented by correlation token 802, which comprises local transaction identifier T1, local system identifier S10, root transaction identifier T1, root system identifier SA5, and registry R1. It can be noted that correlation token 800 and correlation token 802 have the same local transaction identifier because the local transaction identifier portion of the correlation tokens in the present invention are not required to be universally unique but only unique within a given system over a given time period. Since correlation token 800 and correlation token 802 have different local system identifiers, the correlation tokens differ, thereby not resulting in a naming conflict.

In a similar fashion, system S10 has also generated a local transaction identifier T1 for correlation token 804. Moreover, both transaction domain TD1 and TD2 have systems with a common identifier, namely, system S10. However, these two systems lie in different transaction domains, so the registry identifiers would always be different; hence, there would never be a name clash, even if the root systems had the same root system identifier and both generated the same root transaction identifier. In this example, correlation token 804 comprises registry identifier R2 while correlation token 802 comprises registry identifier R1.

Correlation token 806 reflects in a change in transaction domain within the call graph of interest; the root transaction tuple in correlation token 806 differs form the root transaction tuple in correlation tokens 800 and 802. When a correlation token pair for local transaction T1 at system SB1 in transaction domain TD2 is logged, the incoming parent transaction from system SA51 in transaction domain TD1 would have a correlation token containing the originating root transaction tuple, and the incoming transaction token would be stored as the parent correlation token within the correlation token pair. At the same time, the local transaction is associated with correlation token 806 with a different root transaction tuple, and correlation token 806 would become the child correlation token within the correlation token pair. Thus, the correlation token pair that is associated with transaction T1 at system SB1 in transaction domain TD2 would contain two different root transaction tuples, thereby supporting the process that was described with respect to FIG. 7 for determining a call graph out towards the leaf nodes of the call graph.

The advantages of the present invention should be apparent in view of the detailed description that is provided above. The organization of the data permits an analysis of numerous transactions to be computationally tractable and does not require excessive processing or network bandwidth. The decision to build the call graph, and to secure any required authorizations to access registries, can be made after the data is collected without requiring that all data be forwarded to a central location in advance. A call graph that represents a family of related transactions can be built from its root node or an intermediate node out towards the leaf nodes of the call graph; the call graph can also be built from a leaf or intermediate node towards the root node. The use of short identifiers avoids security concerns about long identifiers in the communication of transaction data. In addition, the use of a registry with network location information provides security, both to protect the identity of systems involved in a transaction and to serve as a gatekeeper such that access to registry data is only allowed for authorized persons. Moreover, identifying registries with a universally unique identifier avoids tight coupling and cooperation between the owners of registries.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product stored in a non-transitory computer readable medium when executed by a processor for use in a data processing system for managing transactions, the computer program product comprising:
   instructions for processing data for correlation tokens within the data processing system in a manner such that system identifiers have unique values within a registry that stores system identifiers and such that registry identifiers have unique values within a transaction space of transaction domains which each contain a registry and systems that use a common registry;
   instructions for obtaining a first correlation token that is associated with a parent transaction; and
   instructions for obtaining a second correlation token that is associated with a child transaction of the parent transaction, wherein each correlation token comprises a local transaction identifier, a local system identifier, a root transaction identifier, a root system identifier, and a registry identifier.

2. The computer program product of claim 1 further comprising:
   instructions for obtaining a first registry identifier from the first correlation token, wherein a first system that performs the parent transaction is associated with the first registry identifier;
   instructions for obtaining a second registry identifier, wherein a second system that performs the child transaction is associated with the second registry identifier; and
   instructions for copying a first root system identifier and a first root transaction identifier from the first correlation token for use as a second root system identifier and a second root transaction identifier in the second correlation token in response to a determination that the first registry identifier and the second registry identifier are equivalent.

3. The computer program product of claim 1 further comprising:
   instructions for inserting a local transaction identifier that is associated with the child transaction into the second correlation token;
   instructions for inserting a local system identifier that is associated with a second system that performs the child transaction into the second correlation token; and
   instructions for inserting a registry identifier that is associated with the second system into the second correlation token.

4. The computer program product of claim 1 wherein a local transaction identifier is unique within a local system.

5. The computer program product of claim 1 further comprising:
   instructions for analyzing a correlation token pair to generate a call graph representing a family of related transactions, wherein a correlation token pair comprises the first correlation token for the parent transaction and the correlation token for the child transaction of the parent transaction.

6. The computer program product of claim 1 further comprising:
   instructions for receiving a transaction request message;
   instructions for extracting the first correlation token from the transaction request message; and
   instructions for generating the second correlation token for the child transaction to be performed in response to receiving the transaction request message.

7. The computer program product of claim 1 further comprising:
   instructions for storing the first correlation token and the second correlation token as a correlation token pair for subsequent analysis.

8. The computer program product of claim 2 further comprising:
   instructions for copying a second local system identifier that is associated with the second system and a second local transaction identifier that is associated with the child transaction for use as a second root system identifier and a second root transaction identifier in the second correlation token in response to a determination that the first registry identifier and the second registry identifier are not equivalent.

9. The computer program product of claim 4 wherein a local system identifier is unique within a domain that supports a registry.

10. The computer program product of claim 9 wherein a registry manages network identifiers for systems within a domain.

11. The computer program product of claim 9 wherein a registry identifier is unique within a transaction space.

12. The computer program product of claim 10 wherein a registry performs authorization checks against requests to retrieve information from the registry.

13. The computer program product of claim 11 wherein a transaction space comprises a set of entities that are able to interpret a data format for a correlation token.

14. A data processing system for managing transactions, the data processing system comprising:
    a bus system;
    a storage device connected to the bus system, wherein the storage device stores instructions; and a processing unit connected to the bus system, wherein the processing unit executes the instructions to process data for correlation tokens within the data processing system in a manner such that system identifiers have unique values within a registry that stores system identifiers and such that registry identifiers have unique values within a transaction space of transaction domains which each contain a registry and systems that use a common registry; obtain a first correlation token that is associated with a parent transaction; and obtain a second correlation token that is associated with a child transaction of the parent transaction, wherein each correlation token comprises a local transaction identifier, a local system identifier, a root transaction identifier, a root system identifier, and a registry identifier.

15. The data processing system of claim 14 wherein the processing unit executes further instructions to obtain a first registry identifier from the first correlation token, wherein a first system that performs the parent transaction is associated with the first registry identifier; obtain a second registry identifier, wherein a second system that performs the child transaction is associated with the second registry identifier; and copy a first root system identifier and a first root transaction identifier from the first correlation token for use as a second root system identifier and a second root transaction identifier in the second correlation token in response to a determination that the first registry identifier and the second registry identifier are equivalent.

16. The data processing system of claim 14 wherein the processing unit executes further instructions to insert a local transaction identifier that is associated with the child transaction into the second correlation token; insert a local system identifier that is associated with a second system that performs the child transaction into the second correlation token; and insert a registry identifier that is associated with the second system into the second correlation token.

17. The data processing system of claim 14 wherein a local transaction identifier is unique within a local system.

18. The data processing system of claim 14 wherein the processing unit executes further instructions to analyze a correlation token pair to generate a call graph representing a family of related transactions, wherein a correlation token pair comprises the first correlation token for the parent transaction and the correlation token for the child transaction of the parent transaction.

19. The data processing system of claim 14 wherein the processing unit executes further instructions to receive a transaction request message; extract the first correlation token from the transaction request message; and generate the second correlation token for the child transaction to be performed in response to receiving the transaction request message.

20. The data processing system of claim 14 wherein the processing unit executes further instructions to store the first correlation token and the second correlation token as a correlation token pair for subsequent analysis.

21. The data processing system of claim 15 wherein the processing unit executes further instructions to copy a second local system identifier that is associated with the second system and a second local transaction identifier that is associated with the child transaction for use as a second root system identifier and a second root transaction identifier in the second correlation token in response to a determination that the first registry identifier and the second registry identifier are not equivalent.

22. The data processing system of claim 17 wherein a local system identifier is unique within a domain that supports a registry.

23. The data processing system of claim 22 wherein a registry manages network identifiers for systems within a domain.

24. The data processing system of claim 22 wherein a registry identifier is unique within a transaction space.

25. The data processing system of claim 23 wherein a registry performs authorization checks against requests to retrieve information from the registry.

26. The data processing system of claim 24 wherein a transaction space comprises a set of entities that are able to interpret a data format for a correlation token.

\* \* \* \* \*